United States Patent
Zu et al.

(10) Patent No.: US 9,965,305 B2
(45) Date of Patent: May 8, 2018

(54) STATELESS VIRTUAL MACHINE IN CLOUD COMPUTING ENVIRONMENT AND APPLICATION THEREOF

(71) Applicant: CHINA UNIONPAY CO., LTD., Shanghai (CN)

(72) Inventors: Lijun Zu, Shanghai (CN); Haibing Wang, Shanghai (CN); Hua Cai, Shanghai (CN); Shuo He, Shanghai (CN)

(73) Assignee: China UnionPay Co., Ltd. (CN)

( * ) Notice: Subject to any disclaimer, the term of this patent is extended or adjusted under 35 U.S.C. 154(b) by 26 days.

(21) Appl. No.: 14/787,650

(22) PCT Filed: May 5, 2014

(86) PCT No.: PCT/CN2014/076782
§ 371 (c)(1),
(2) Date: Oct. 28, 2015

(87) PCT Pub. No.: WO2014/180290
PCT Pub. Date: Nov. 13, 2014

(65) Prior Publication Data
US 2016/0077855 A1   Mar. 17, 2016

(30) Foreign Application Priority Data

May 5, 2014   (CN) .......................... 2013 1 0161987

(51) Int. Cl.
*G06F 9/455*   (2006.01)
*G06F 9/445*   (2018.01)

(52) U.S. Cl.
CPC ............ *G06F 9/45533* (2013.01); *G06F 8/63* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS 8,286,174 B1 * 10/2012 Schmidt ................ G06F 9/5077
709/226
2006/0184936 A1   8/2006 Abels et al.
(Continued)

FOREIGN PATENT DOCUMENTS

CN   101377745 A   3/2009
CN   101876909 A   11/2010
(Continued)

OTHER PUBLICATIONS

International Search Report corresponding to International Application No. PCT/CN2014/076782 dated Aug. 8, 2014.
(Continued)

*Primary Examiner* — Dong Kim
(74) *Attorney, Agent, or Firm* — Myers Bigel, P.A.

(57) ABSTRACT

The invention provides a stateless virtual machine in a cloud computing environment as well as an application thereof, and pertains to the technical field of cloud computing. The stateless virtual machine is mapped into a storage device of a computer in the form of file and specifically comprises: an application data image file for storing an application; an operating system (OS) image file for storing an operating system; and an application middleware corresponding to the application; wherein a middleware core of the application middleware is placed in the OS image file, a middleware configuration of the application middleware is placed in the application data image file, and the middleware core and the middleware configuration are associated so as to realize that the middleware core specifies a corresponding middleware configuration. The virtual machine can realize a stateless condition even for an application in an application middle- (Continued)

ware environment, the flexibility is good, and the configuration manageability is strong.

20 Claims, 3 Drawing Sheets

(56) References Cited

U.S. PATENT DOCUMENTS

| | | | |
|---|---|---|---|
| 2007/0038998 A1* | 2/2007 | Fries | G06F 9/45537 718/1 |
| 2010/0088699 A1* | 4/2010 | Sasaki | G06F 8/63 718/1 |
| 2011/0126186 A1* | 5/2011 | Srinivasan | G06F 8/63 717/171 |
| 2011/0246830 A1* | 10/2011 | Chowdhury | G06F 8/40 714/35 |
| 2011/0265087 A1* | 10/2011 | Chen | G06F 11/3051 718/102 |
| 2012/0324446 A1* | 12/2012 | Fries | G06F 21/64 718/1 |
| 2014/0068599 A1* | 3/2014 | Kannan | G06F 8/61 718/1 |

FOREIGN PATENT DOCUMENTS

| | | |
|---|---|---|
| CN | 102541625 A | 7/2012 |
| WO | WO 2012/032326 A1 | 3/2012 |

OTHER PUBLICATIONS

CN Office Action for corresponding CN Application 201310161987.0, dated Nov. 23, 2016.
Extended European Search Report for corresponding EP Application No. 14794845.9, dated Nov. 21, 2016.
Bin Chen et al., Fast, On-Demand Software Deployment with Lightweight, Independent Virtual Disk Images, IEEE 2009 Eighth International Conference on Grid and Cooperative Computing, (2009) pp. 16-23.

* cited by examiner

STATELESS VIRTUAL MACHINE IN CLOUD COMPUTING ENVIRONMENT AND APPLICATION THEREOF

RELATED APPLICATIONS

This application is a 35 U.S.C. § 371 national phase application of PCT Application PCT/CN2014/076782 filed May 5, 2014 which claims priority to Chinese Application No. 201310161987.0 filed May 6, 2013. The entire content of each is incorporated herein by reference in its entirety.

FIELD OF THE INVENTION

The invention pertains to the technical field of cloud computing, and relates to a stateless virtual machine for realizing a stateless condition for an application in an application middleware environment, as well as an application thereof.

BACKGROUND

A typical characteristic of cloud computing environment is "commonality". This characteristic ensures that the same piece of "cloud" can support a normal operation of an application at any physical location and with any configuration combination in the cloud environment, thus achieving the purpose of flexibly configuring and managing the application.

Currently, a stateless use of resource is advocated in the cloud computing environment. Therefore, relevant researchers have proposed a stateless virtual machine. A main design concept of the stateless virtual machine is to partition the virtual machine into an OS (operating system) image file and an application data service image file.

FIG. 1 shows an exploded schematic view of a conventional stateless virtual machine. As shown in FIG. 1, an OS.qcow2 file existing in the physical system disc corresponds to the operating system and is an OS image file which can be responsible for running the operating system and installing common software (e.g., JDK, Jboss, etc.); an data.qcow2 file existing in the physical data disc corresponds to the application data service image file and can store running code, configuration file, log and service data of the application itself. The object of such a design is to hope that the application can run normally after any combination of any data disc with other system discs, without being limited by the restrictions of the operating system disc. Meanwhile, the OS image file will be used as a template image, the newly created virtual machine usually reproduce the template image as a basis, and dynamically creates an empty file as a data service image.

While the stateless virtual machine shown in FIG. 1 can directly run a Java program in a simple application scene, the goal of separating and decoupling the application from the system can be obtained. However, there are many difficulties with a complicated scene having an application middleware. Existing technical solutions of stateless virtual machine having an application middleware mainly have two structures shown in FIGS. 2 and 3.

FIG. 2 is a schematic view showing the module structure of a stateless virtual machine according to an embodiment in the prior art. As shown in FIG. 2, the stateless virtual machine 10 mainly comprises an OS image file 11 and an application data image file 13 that are placed separately, and further comprises an application middleware 15, wherein the application middleware 15 is entirely stored in the OS image file 11 of the corresponding operating system. Specifically, a middleware program (i.e., a middleware core 151 of the application middleware 15) and relevant configuration (i.e., a middleware configuration 153 of the application middleware 15) are stored in the OS image file 11, and application codes and relevant data (i.e., application data) are stored in the application data image file 13. In the stateless virtual machine in this embodiment, the operating system and the middleware are in the same physical storage disc, i.e., in the same one OS image file. Although the solution of the stateless virtual machine in this embodiment facilitates producing a uniform template image, the middleware configurations 153 are actually personalized and differentiated for different application, this is because the middleware configuration 153 has an associated relationship with the application 131 of the application data image file 13, e.g., the start configuration parameter of the application 131, etc. As such, when the application data image file 13 is combined with another OS image file 11, the application cannot be started normally since the middleware configuration 153 does not match with the application 131.

FIG. 3 is a schematic view showing the module structure of a stateless virtual machine according to another embodiment in the prior art. As shown in FIG. 3, the stateless virtual machine 20 mainly comprises an OS image file 21 and an application data image file 23 that are placed separately, and further comprises an application middleware 25, wherein the application middleware 25 is entirely stored in the application data image file 23. Therefore, the application 231 and the application middleware 25 are both stored in the application data image file 23. It is understood that essentially the OS image file 21 is merely a highly standardized operating system. In the stateless virtual machine in this embodiment, since the application data image file 23 contains all the configurations related to application personalization (i.e., the middleware configurations 253), it can be used in combination with any other standardized OS image file 21 and the problem of the virtual machine in the embodiment shown in FIG. 2 is overcome.

However, even the framework features of the virtual machine in the embodiment shown in FIG. 3 also greatly reduce the efficiency in disposing applications by the data center. This is because: firstly, the OS image file (template image) 21 does not contain the application middleware 25; therefore, each time a virtual machine is newly generated, it is required to reinstall the application middleware 25 and the application 231 in the application data image file 23 (since the application data image is initially an empty disc space), and as compared to a situation in which the OS image file (template image) has an installed application middleware (the embodiment shown in FIG. 2), it is merely required to re-dispose the application in FIG. 2, and the complexity in disposing the application in the embodiment shown in FIG. 3 is greatly increased; secondly, since the automatic application starting service is often associated in the operating system, the operating system cannot locate the application middleware 25 since the application middleware 25 is not installed in the disc (i.e., the OS image file 21) in which the operating system is located, thus making it impossible for the application to start automatically after the virtual machine restarts.

Therefore, the framework features in the prior art stateless virtual machine using an application middleware lead to various problems, and make it hard to balance between the efficiency and the personalized configurations.

SUMMARY OF THE INVENTION

In order to address the above technical problem or other technical problems, the invention provides the following technical solutions.

According to an aspect of the invention, a stateless virtual machine in a cloud computing environment is provided, which is mapped into a storage device of a computer in the form of file and specifically comprises:

an application data image file for storing an application;

an operating system (OS) image file for storing an operating system; and an application middleware corresponding to the application;

wherein a middleware core of the application middleware is placed in the OS image file, a middleware configuration of the application middleware is placed in the application data image file, and the middleware core and the middleware configuration are associated so as to realize that the middleware core specifies a corresponding middleware configuration.

In the stateless virtual machine according to an embodiment of the invention, the middleware core is provided therein with a configuration item, through which a position of the corresponding middleware configuration is directed at, so as to realize the association.

In the stateless virtual machine according to another embodiment of the invention, a plurality of stateless virtual machines are configured with a database in common, into which storing position information of the middleware configuration directed by the corresponding middleware core is stored; when the middleware core is started, the database is read so as to direct at the position of the corresponding middleware configuration, thus realizing the association.

In the stateless virtual machine according to any of the above described embodiments of the invention, the middleware core is mainly used for performing a basic service of the middleware.

In the stateless virtual machine according to any of the above described embodiments of the invention, the middleware configuration is mainly used for configuring a configuration required for the middleware itself and a configuration of the application.

In the stateless virtual machine according to any of the above described embodiments of the invention, the middleware core is solidified in the OS image file.

In the stateless virtual machine according to any of the above described embodiments of the invention, the middleware core specifies a fixed directory in the application data image file as the directory of the middleware configuration.

In the stateless virtual machine according to any of the above described embodiments of the invention, the OS image file is stored in a physical system disc of the storage device, and the application data image file is stored in a physical data disc of the storage device.

According to another aspect of the invention, an application of any of the above described stateless virtual machine is provided, wherein the stateless virtual machine is used at least for edition upgrade of the OS image file.

According to further another aspect of the invention, an application of any of the above described stateless virtual machine is provided, wherein the stateless virtual machine is used for the backup of the virtual machine, wherein only the application data image file is backed up.

According to still another aspect of the invention, an application of any of the above described stateless virtual machine is provided, wherein the stateless virtual machine is used for restoring the virtual machine when the OS image file is damaged, wherein an OS image file is re-generated from an image temple base.

The technical effect brought about by the invention is that the middleware core and the middleware configuration of the application middleware that were originally placed together are decoupled and installed in the OS image and the data service image of the virtual machine respectively, and a newly introduced association mechanism enables the middleware core and the middleware configuration to be associated. Therefore, a stateless condition is realized even for an application in an application middleware environment, the flexibility is good, and the configuration manageability is strong; moreover, it is not required for the newly created virtual machine to install application middleware repeatedly, and the application can be self-started after the virtual machine is restarted.

BRIEF DESCRIPTION OF THE DRAWINGS

The above and other objects and advantages of the invention will become clearer and through from the following detailed description made with reference to the accompanying drawings, in which identical or similar elements are denoted by identical reference signs.

DETAILED DESCRIPTION OF THE UTILITY MODEL

Some of the many possible embodiments of the invention will be described below so as to provide a basic understanding of the invention rather than identifying crucial or decisive elements of the invention or defining the scope of protection. It is understood that according to the technical solutions of the invention, those skilled in the art can propose other alternative implementations without departing from the true spirit of the invention. Therefore, the following specific embodiments and drawings are merely illustrative description of the technical solutions of the invention, and should not be considered as the whole of the invention or as defining or limiting the technical solutions of the invention.

Figure 1:
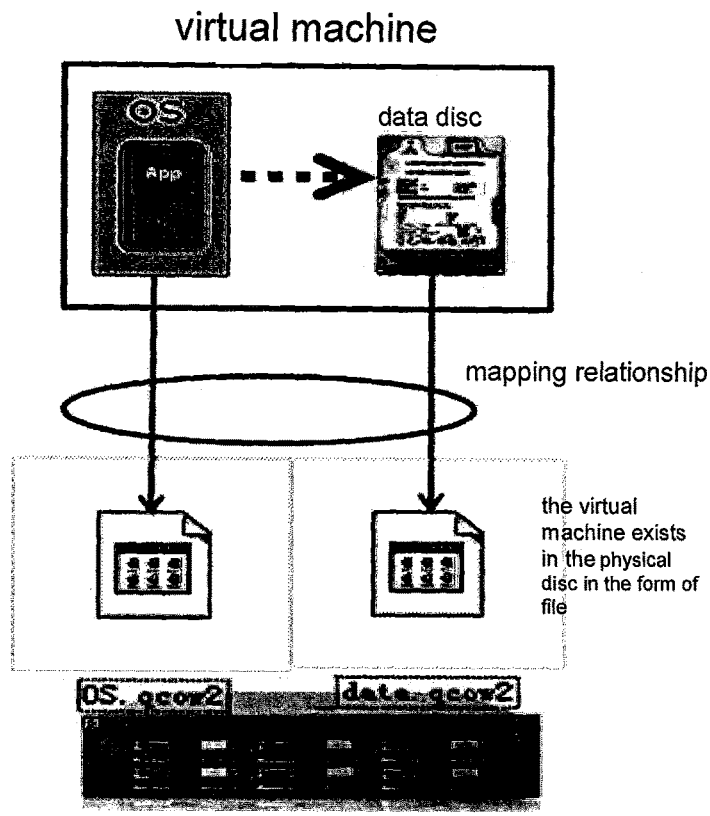
FIG. 1 is an exploded schematic view of a conventional stateless virtual machine.
Figure 2:
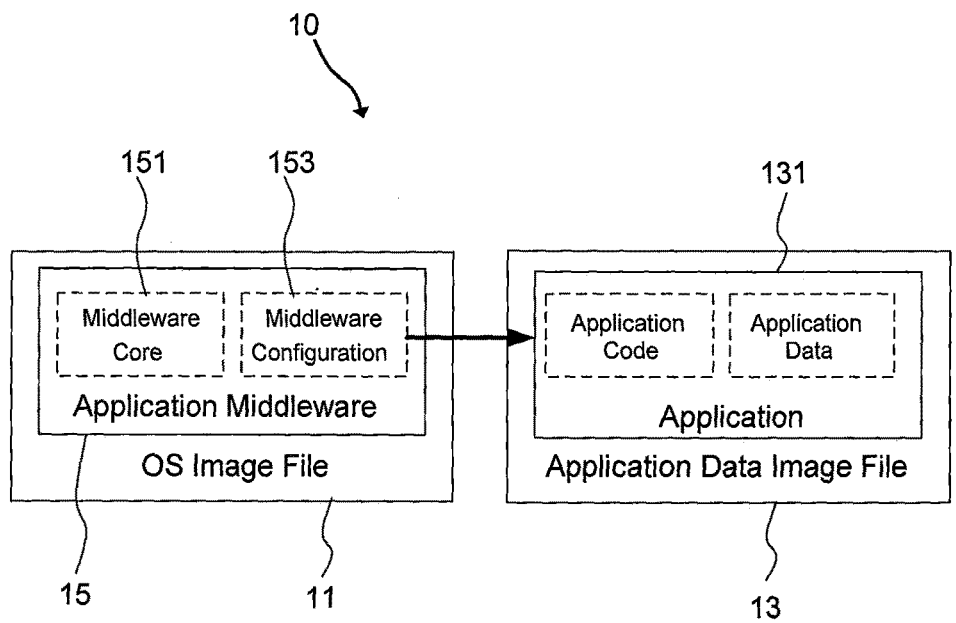
FIG. 2 is a schematic view showing the module structure of a stateless virtual machine according to an embodiment in the prior art.
Figure 3:
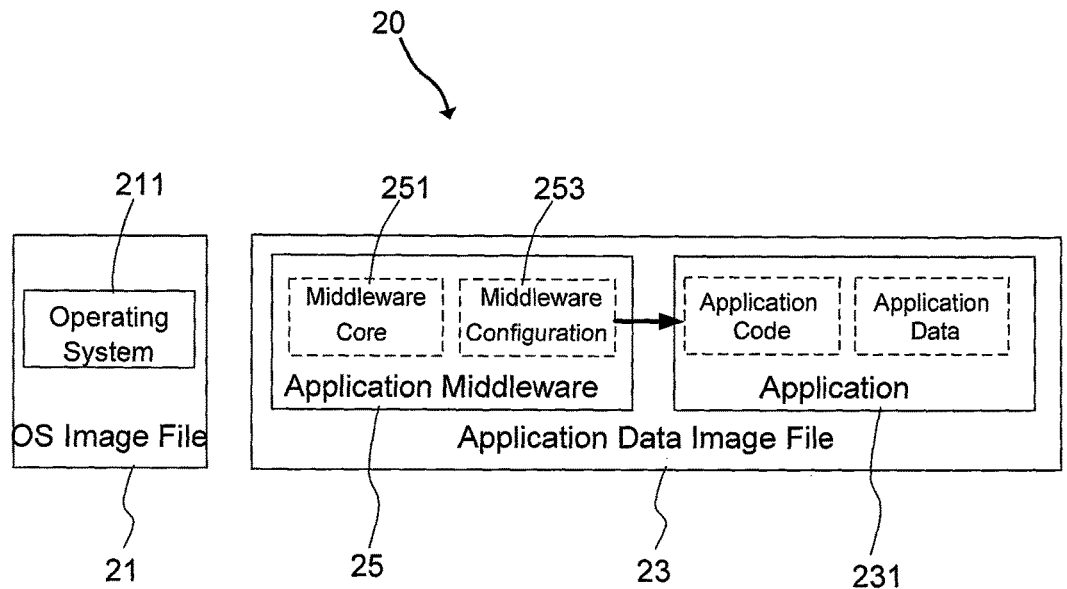
FIG. 3 is a schematic view showing the module structure of a stateless virtual machine according to another embodiment in the prior art.
Figure 4:
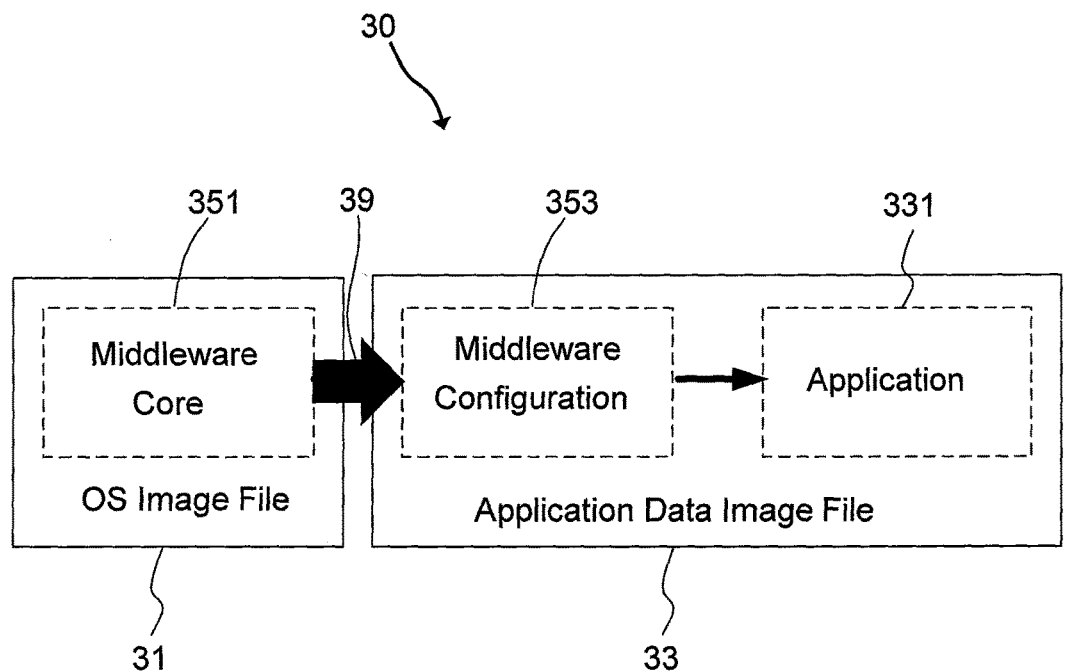
FIG. 4 is a schematic view showing the module structure of a stateless virtual machine in a cloud computing environment according to an embodiment of the invention.

FIG. 4 is a schematic view showing the module structure of a stateless virtual machine in a cloud computing environment according to an embodiment of the invention. The virtual machine 30 is also mapped into a storage device of a computer in the form of file, and the mapped files specifically comprise: an OS image file 31 stored in a physical system disc of the storage device of the computer, an application data image file 33 stored in a physical data disc of the storage device of the computer, and an application middleware, wherein the OS image file 31 at least corresponds to the operating system, the application data image file 33 at least corresponds to the application program data and therefore stores an application 331 containing application code and application data, which are mainly application execution code and application log, etc. Specifically, the application middleware is abstracted to be mainly composed of a middleware core 351 and a middleware configuration 353, wherein the middleware core 351 is mainly used for performing a basic service of the middleware, and the middleware configuration 353 is mainly used for configuring a configuration required for the middleware itself and a configuration of the application and determines start parameters of the application, etc.

In a stateless virtual machine of the prior art, the middleware core and the middleware configuration of the application middleware are bound together. Therefore, those skilled in the art hold the opinion that such an arrangement would make the configuration solidify in the core when the middleware is started.

In the embodiment of the invention, as shown in FIG. 4, the middleware core 351 and the middleware configuration 353 of the application middleware are decoupled and stored in the OS image file 31 and the application data image file 33 respectively. Therefore, their storage positions are independent from each other, and a new association mechanism 39 is required so that the middleware core can specify a corresponding middleware configuration.

Figure 5:
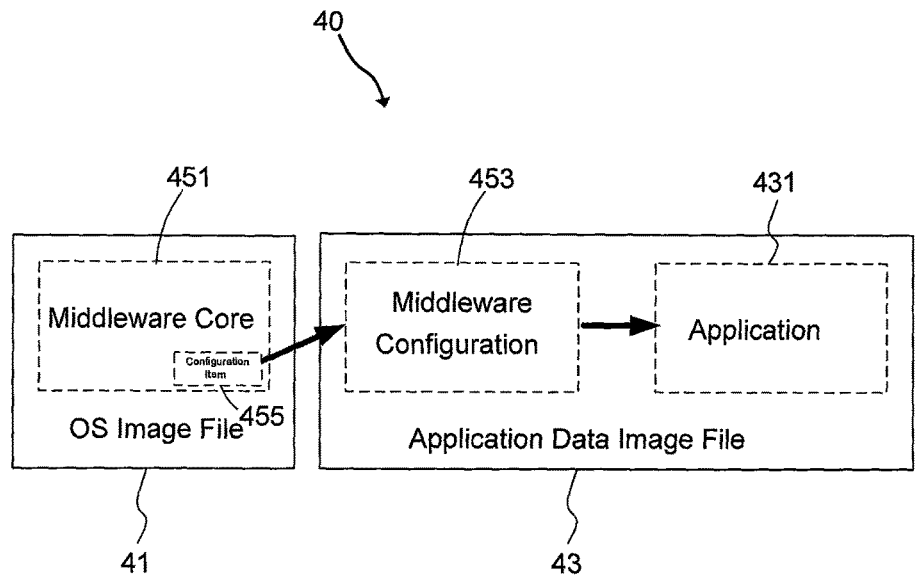
FIG. 5 is a schematic view showing the module structure of a stateless virtual machine in a cloud computing environment according to another embodiment of the invention.

FIG. 5 is a schematic view showing the module structure of a stateless virtual machine in a cloud computing environment according to another embodiment of the invention. The virtual machine 40 is also mapped into a storage device of a computer in the form of file, and the mapped files specifically comprise: an OS image file 41 stored in a physical system disc of the storage device of the computer, an application data image file 43 stored in a physical data disc of the storage device of the computer, and an application middleware, wherein the OS image file 41 at least corresponds to the operating system, the application data image file 43 at least corresponds to the application program data and therefore stores an application 431 containing application code and application data, which are mainly application execution code and application log, etc. Specifically, the application middleware is abstracted to be mainly composed of a middleware core 451 and a middleware configuration 453, wherein the middleware core 451 is mainly used for performing a basic service of the middleware, and the middleware configuration 453 is mainly used for configuring a configuration required for the middleware itself and a configuration of the application and determines start parameters of the application, etc.

The embodiment shown in FIG. 5 illustrates one of the association mechanisms between the decoupled middleware core and middleware configuration. In this embodiment, a configuration item 455 is provided in the middleware core 451, through which a position of the corresponding middleware configuration 453 is directed at, so as to realize the association between the middleware core and the middleware configuration. In the technical solution of this embodiment, a layer of configuration information concerning the middleware configuration (i.e., containing position information stored by the middleware configuration) is added. By adding a layer of metadata corresponding to the configuration item 455, an association between the middleware core 451 and the corresponding middleware configuration 453.

Figure 6:
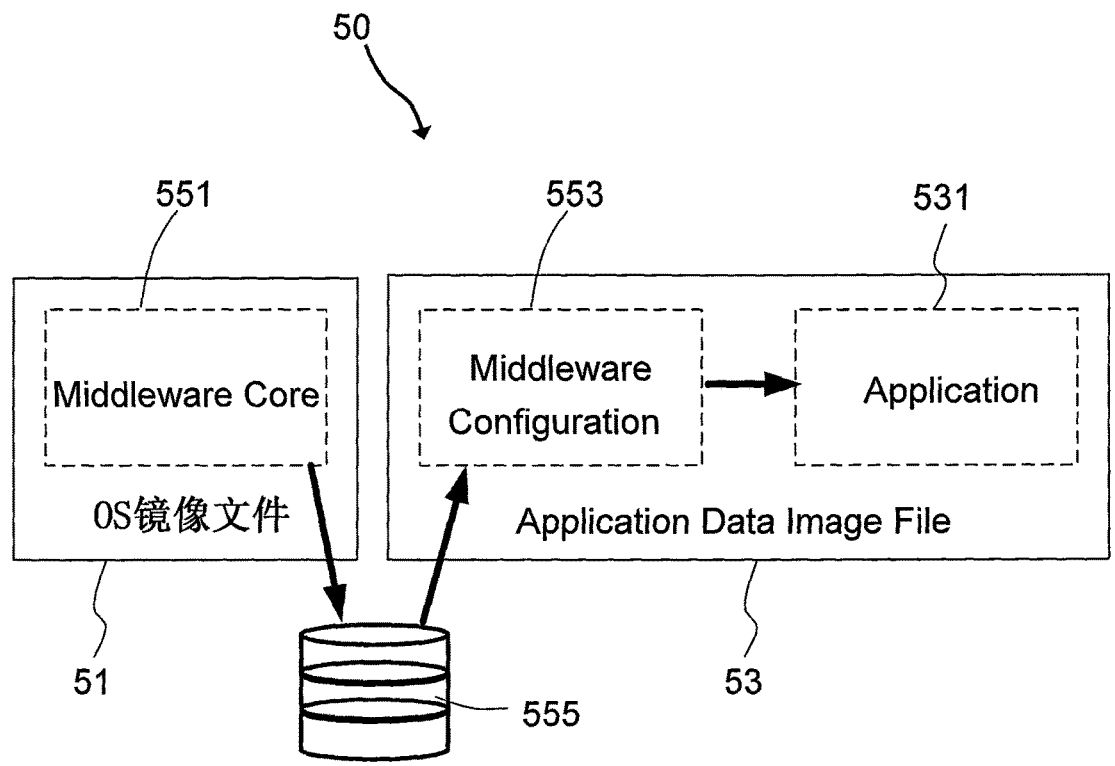
FIG. 6 is a schematic view showing the module structure of a stateless virtual machine in a cloud computing environment according to further another embodiment of the invention.

FIG. 6 is a schematic view showing the module structure of a stateless virtual machine in a cloud computing environment according to further another embodiment of the invention. The virtual machine 50 is also mapped into a storage device of a computer in the form of file, and the mapped files specifically comprise: an OS image file 51 stored in a physical system disc of the storage device of the computer, an application data image file 53 stored in a physical data disc of the storage device of the computer, and an application middleware, wherein the OS image file 51 at least corresponds to the operating system, the application data image file 53 at least corresponds to the application program data and therefore stores an application 531 containing application code and application data, which are mainly application execution code and application log, etc. Specifically, the application middleware is abstracted to be mainly composed of a middleware core 551 and a middleware configuration 553, wherein the middleware core 551 is mainly used for performing a basic service of the middleware, and the middleware configuration 553 is mainly used for configuring a configuration required for the middleware itself and a configuration of the application and determines start parameters of the application, etc.

The embodiment shown in FIG. 6 illustrates another one of the association mechanisms between the decoupled middleware core and middleware configuration. In this embodiment, the stateless virtual machine 50 is further configured with a database 555. Specifically, the database 555 can be shared by a plurality of virtual machines 50. The storing position information of the middleware configuration 553 at which all the corresponding middleware cores 551 of the plurality of virtual machines 50 direct is stored in the database 555 so as to facilitate a centralized management; the middleware core 551 reads the database 555 when it is started so as to direct at the position of a corresponding middleware configuration 553, thus realizing an association between the middleware core 551 and the middleware configuration 553.

When the embodiments of two association mechanisms are shown above in FIGS. 5 and 6, those skilled in the art can use other association mechanisms based on the above teaching or enlightenment. Therefore, the association between the middleware core and the middleware configuration is not limited to the situations of the embodiments of the invention.

In summary, the middleware core and the middleware configuration of the application middleware that were originally placed together are decoupled and installed in the OS image and the data service image of the virtual machine respectively, and a newly introduced association mechanism enables the middleware core and the middleware configuration to be associated. By doing so, an application in a data service disc (i.e., application data image file) of a virtual machine in a middleware environment can cooperate with another OS image and run normally. Therefore, the data service image in the virtual machine of the invention can achieve the following similar effect, that is, a mobile hard disc drive in real life that has installed green application software, when connected to any personal computer, can run this green software.

Specifically, the virtual machine of the invention has the following advantages:

Firstly, in the virtual machine of the invention, a stateless condition that was originally made possible only at the operating system level is extended to the application level so that a stateless condition is achieved even for an application in an application middleware environment. That is, an application in any data service disc (i.e., application data image file) of a virtual machine can cooperate with another OS image and run normally. Therefore, using the virtual machine of the invention will exhibit better flexibility and configuration manageability.

Secondly, the newly created virtual machine does not need to install the application middleware repeatedly since it is already solidified in the image template (OS image file);

Thirdly, by configuring an automatic start item of the application middleware in the image template (OS image file), the virtual machine can automatically start a corresponding application after restart.

Therefore, the virtual machine of the invention will greatly improve the convenience of managing applications and computing resources, and the applications thereof mainly include, but are not limited to, the following service scene modes:

(1) As an alternative to the upgrade of patches or versions such as the operating system in the OS image, basic services and application middleware. A computer system (herein referring to a virtual machine) usually has to upgrade its system edition or middleware software edition (e.g. Jboss) as scheduled. Based on the solution of the invention, a system administrator no longer has to upgrade each virtual machine (there could be tens of thousands of virtual machines in a cloud computing environment), and he only has to perform the upgrade for one time, and all the virtual machines created based on this image template can be upgraded by subsequent mounting and replacing one by one. By doing so, the risk in system upgrade is also greatly reduced.

(2) Only the application service data image file has to be backed up when backing up the virtual machine. Since the OS image files tend to be the same after using the technical solution of the invention, only one copy of the image template has to be saved. When performing the back up, only the personalized service data image file has to be backed up.

(3) When the OS image file is damaged, the virtual machine is restored. Firstly, after using the stateless virtual machine, a fault section is isolated to be an OS image and a service image; secondly, the OS image has a higher risk of damaging the image file due to complicated services such as running the operating system therein. Therefore, when the OS image file is damaged, an OS image can be re-generated from the image template base so as to restore the virtual machine.

The above examples mainly describe a stateless virtual machine in a cloud computing environment according to the invention as well as various application methods. While only some of the embodiments of the invention have been described, those skilled in the art will understand that the invention can be carried out in many other forms without departing from the spirit and scope of the invention. Therefore, the illustrated examples and embodiments should be considered as schematic instead of being limiting. The invention can cover various modifications and substitutes without departing from the spirit and scope of the invention defined by the appended claims.

The invention claimed is:

1. A non-transitory computer-readable storage device comprising a stateless virtual machine, wherein the stateless virtual machine is mapped into the storage device in files, the files comprising:
an application data image file comprising computer-readable instructions providing an application that includes application code and application data; and
an operating system (OS) image file separate from the application data image file and comprising computer-readable instructions providing an operating system;
wherein the stateless virtual machine further comprises an application middleware corresponding to the application and comprising a middleware core and a middleware configuration stored separate from each other;
wherein the OS image file comprises further computer-readable instructions providing the middleware core of the application middleware, wherein the application data image file comprises further computer-readable instructions providing the middleware configuration of the application middleware, and wherein the further computer-readable instructions providing the middleware core are configured to start the middleware core to associate the middleware core to a position of the middleware configuration.

2. The non-transitory computer-readable storage device according to claim 1, wherein the further computer-readable instructions providing the middleware core further provide a configuration item that specifies the position of the middleware configuration.

3. The non-transitory computer-readable storage device according to claim 2, wherein the middleware core performs a middleware service.

4. The non-transitory computer-readable storage device according to claim 2, wherein the middleware configuration configures the application middleware and the application.

5. The non-transitory computer-readable storage device according to claim 2, wherein the configuration item specifies a fixed directory in the application data image file as a directory of the middleware configuration.

6. The non-transitory computer-readable storage device according to claim 2, wherein the OS image file is stored in a physical system disc of the non-transitory computer-readable storage device, and the application data image file is stored in a physical data disc of the non-transitory computer-readable storage device.

7. The non-transitory computer-readable storage device according to claim 1, wherein the further computer-readable instructions providing the middleware core identifies a database storing position information of the middleware configuration; the further computer-readable instructions providing the middleware core further providing that when the middleware core is started, the database is read and the middleware configuration is located.

8. The non-transitory computer-readable storage device according to claim 7, wherein the middleware core performs a middleware service.

9. The non-transitory computer-readable storage device according to claim 7, wherein the middleware configuration configures the application middleware and the application.

10. The non-transitory computer-readable storage device according to claim 7, wherein the position information specifies a fixed directory in the application data image file as a directory of the middleware configuration.

11. The non-transitory computer-readable storage device according to claim 7, wherein the OS image file is stored in a physical system disc of the non-transitory computer-readable storage device, and the database and the application data image file are stored in a physical data disc of the non-transitory computer-readable storage device.

12. The non-transitory computer-readable storage device according to claim 1, wherein the middleware core performs a middleware service.

13. The non-transitory computer-readable storage device according to claim 1, wherein the middleware configuration configures the application middleware and the application.

14. The non-transitory computer-readable storage device according to claim 1, wherein the position of the middleware configuration comprises a fixed directory in the application data image file.

15. The non-transitory computer-readable storage device according to claim 1, wherein a physical system disc of the non-transitory computer-readable storage device comprises the OS image file, and wherein a physical data disc of the non-transitory computer-readable storage device comprises the application data image file.

16. The non-transitory computer-readable storage device according to claim 1, further comprising instructions that, when executed by a processor, is configured to perform an edition upgrade of the OS image file.

17. The non-transitory computer-readable storage device according to claim 1, further comprising instructions that, when executed by a processor, is configured to perform a backup of the application data image file.

18. The non-transitory computer-readable storage device according to claim 1, further comprising instructions that, when executed by a processor, is configured to restore the OS image file when the OS image file is damaged by re-generating the OS image file from an image template base.

19. A non-transitory computer-readable storage device comprising:
a plurality of application data image files each comprising computer-readable instructions providing an application that includes application code and application data;
a plurality of operating system (OS) image files each comprising computer-readable instructions providing an operating system;
wherein each of the application data image files is associated with a respective one of the plurality of OS image files to provide a plurality of stateless virtual machines, each stateless virtual machine comprising one of the plurality of application data image files and the respective one of the plurality of OS image files stored separately in the storage device;
wherein each of the plurality of stateless virtual machines further comprises application middleware corresponding to the application and comprising a middleware core and a middleware configuration stored separate from each other, wherein the middleware core is stored in the OS image file of the stateless virtual machine and the middleware configuration is stored in the application data image file; and
wherein the non-transitory computer-readable storage device comprises a database shared by the plurality of stateless virtual machines and configured to start the middleware core to associate a position information of each middleware configuration to the middleware core.

20. A non-transitory computer-readable storage device comprising:
a virtual machine stored in the storage device in files, the files comprising an application data image file comprising computer-readable instructions that provide an application that includes application code and application data; and an operating system (OS) image file stored separate from the application data image file and comprising computer-readable instructions that provide an operating system;
wherein the virtual machine further comprises application middleware for the application, wherein the application middleware comprises a middleware core stored in the OS image file and a corresponding middleware configuration stored in the application data image file, and wherein the middleware core is started to associate a position information of the corresponding middleware configuration to the middleware core; and executable code configured to:
initiate the virtual machine and run the operating system based on the OS image file and the application data image file, and
start execution of the application within the virtual machine using the application middleware for the application.

* * * * *